United States Patent [19]
Wendt et al.

[11] Patent Number: 5,025,399
[45] Date of Patent: Jun. 18, 1991

[54] METHOD AND APPARATUS FOR PERSONALIZING PLASTIC CARDS

[75] Inventors: Richard W. Wendt, Shakopee; Brian Johnson, St. Louis Park, both of Minn.

[73] Assignee: DataCard Corporation, Minnetonka, Minn.

[21] Appl. No.: 248,811

[22] Filed: Sep. 23, 1988

[51] Int. Cl.$^5$ .................... G06K 19/06; G06F 15/626
[52] U.S. Cl. .................... 364/519; 235/380; 364/518
[58] Field of Search ............... 364/518–521; 340/721, 723, 724, 729, 750; 235/380; 400/84, 120, 130; 100/162, 416.1, 417, 418; 346/76 PH, 160; 355/296, 298

[56] References Cited

U.S. PATENT DOCUMENTS

| | | | |
|---|---|---|---|
| 4,467,335 | 8/1984 | Schmidt et al. | 346/168 |
| 4,629,306 | 12/1986 | Warwick | 355/3 R |
| 4,656,602 | 4/1987 | Bukland et al. | 364/900 |
| 4,675,746 | 6/1987 | Tetrick et al. | 358/296 |
| 4,677,427 | 6/1987 | Komatsu | 340/750 X |
| 4,745,560 | 5/1988 | Decker et al. | 364/519 |
| 4,764,666 | 8/1988 | Bergeron | 235/380 |
| 4,769,648 | 9/1988 | Kishino et al. | 364/519 |
| 4,772,782 | 9/1988 | Nonat | 235/380 |
| 4,796,201 | 7/1989 | Wake | 340/724 X |
| 4,801,787 | 1/1989 | Suzuki | 235/380 |
| 4,827,425 | 5/1989 | Linden | 235/380 X |
| 4,874,934 | 10/1989 | Nakahara et al. | 235/380 X |

*Primary Examiner*—Heather R. Herndon
*Attorney, Agent, or Firm*—Merchant, Gould, Smith, Edell, Welter & Schmidt

[57] ABSTRACT

An apparatus for printing graphics images on plastic cards comprises a computer, a graphics printer connected to the computer, and control means executing on the computer for supplying graphic images to said graphics printer. The control means parse commands from an input data stream by identifying a delimiter preceding each command. The control means create images to be printed on the plastic card in response to the commands. The control means combine the images into a composite image and supply the composite image to the graphics printer.

13 Claims, 11 Drawing Sheets

86 LOGO DEFINITOIN FILE FORMAT

FIG. 11

111 IMAGE ELEMENT

```
G\  \LN1=DATACARD   \LH1=0400   \LV1=1200   \\
```
— 118

*DataCard* — 119 / 120

```
G\   \F01==GF1    \H01==0571   \V01==1200
     \F02==GF2    \H02==0550   \V02==0800   \EDC==~
\D01=TEXT LINE ONE..GF1~
\D02=TEXT LINE TWO..GF2~
```
— 121

TEXT LINE ONE..GF1 — 123
TEXT LINE TWO..GF2 — 124
— 122

```
G\   \BT1==JAN8   \BH1==0400   \BV1==0200
     \BT6==NW7    \BH6==0800   \BV6==1200   \EDC==~
\BD1=12345678~
\BD6=A11223344556677889900A~   \\
```
— 125

LOGOS

129 - LN#=     (THIS CARD'S LOGO [#] NAME)
130 - LH#=     (THIS CARD'S LOGO [#] HORIZONTAL POSITION)
131 - LV#=     (THIS CARD'S LOGO [#] VERTICAL POSITION)

ENGLISH AND KANJI TEXT

132 - EDC==    (SET END-OF-DATA CODE FOR TEXT AND BARCODES)
133 - F##==    (SET TEXT LINE [##]'S TYPE AND FONT)
134 - H##==    (SET TEXT LINE [##]'S HORIZONTAL POSITION)
135 - V##==    (SET TEXT LINE [##]'S VERTICAL POSITION)
136 - D##=     (THIS CARD'S TEXT LINE [##] DATA)

BARCODES

137 - EDC#==   (SET END-OF-DATA CODE FOR TEXT AND BARCODES)
138 - BT#==    (SET BARCODE [#]'S TYPE)
139 - BH#==    (SET BARCODE [#]'S HORIZONTAL POSITION)
140 - BV#==    (SET BARCODE [#]'S VERTICAL POSITION)
141 - BD#=     (THIS CARD'S BARCODE [#] DATA)

FIG. 15

| CHARACTER SET | CELL WIDTH | CELL HEIGHT |
|---|---|---|
| 142 - GF1 | 34 | 48 |
| 143 - GF2 | 24 | 32 |
| 144 - KJ1 | 26 | 24 |
| 145 - KJ2 | 34 | 32 |
| 146 - KJ3 | 50 | 48 |
| 147 - KJ4 | 66 | 64 |
| 148 - KI1 | 26 | 24 |
| 149 - KI2 | 34 | 32 |
| 150 - KI3 | 50 | 48 |
| 151 - KI4 | 66 | 64 |

FIG. 16

METHOD AND APPARATUS FOR PERSONALIZING PLASTIC CARDS

TECHNICAL FIELD OF THE INVENTION

The present invention pertains generally to an apparatus and method for printing graphics images, text, and barcodes on plastic cards.

BACKGROUND OF THE INVENTION

Plastic cards, such as those used for credit cards, debit cards, security cards, and the like, are pervasive within modern society. Prior art methods of manufacturing these plastic cards first require that generic cards be stamped with logos, corporate names, and other features. An inventory of these stamped cards is maintained and supplied eventually to an embossing machine for personalization. The personalization process includes, for example, embossing a customer's name on the plastic card. These prior art methods are costly and inefficient because an inventory of stamped cards must be maintained prior to the personalization process.

SUMMARY OF THE INVENTION

The present invention replaces prior art methods with a sophisticated card personalization system. One object of the present invention is to permit the imprinting of graphic images, text, and barcodes, on generic plastic cards, thereby bypassing the need for maintaining an inventory on stamped cards.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. It is to be understand that other embodiments may be utilized without departing from the scope of the present invention.

The present invention is a graphics Image Generator program that imprints graphic images, text, and barcodes on plastic cards. The present invention includes the specific data format for supplying input to these graphics printing functions.

Figure 1:
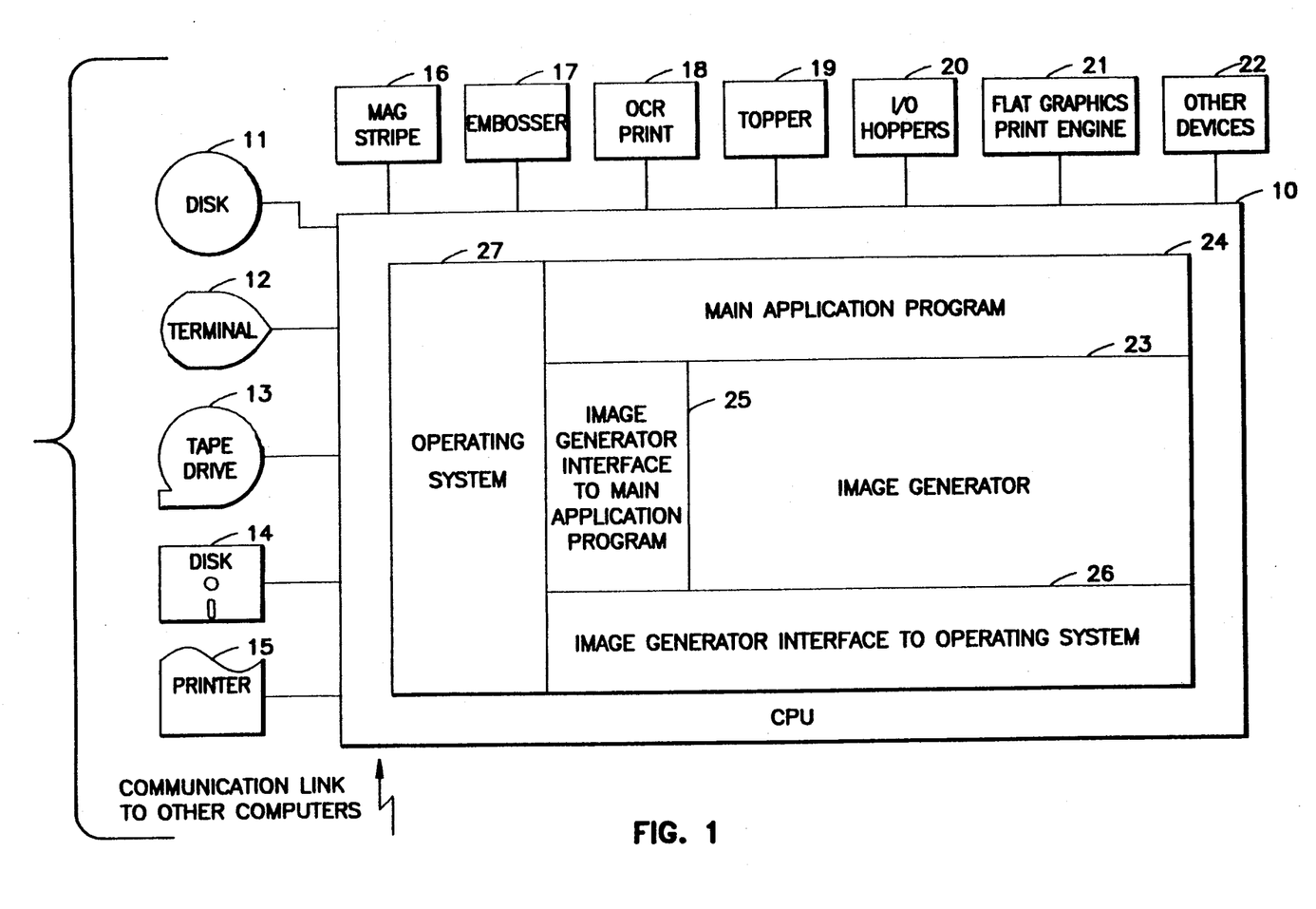
FIG. 1 is a block diagram describing the computer system, associated peripheral devices, and the Image Generator software of the present invention.

Referring initially to FIG. 1, the Image Generator 23 resides on a computer system that drives a number of peripheral devices associated with card personalization. Shown in FIG. 1 is the Computer 10, that executes the Image Generator 23. Attached to the Computer 10 are such standard peripherals as a Hard Disk 11, a Terminal 12, a Tape Drive 13, a Floppy Disk 14, and a Printer 15. The Computer 10 also controls the operation of a number of peripheral devices associated with card personalization systems. These devices include a Magnetic Striper 16, an Embosser 17, an OCR Printer 18, a Topper 19, Input and Output Hoppers 20, a graphics Print Engine 21, and other devices 22. Within the Computer 10, the Image Generator 23 creates the graphic images printed via the Print Engine 21. The Image Generator 23 operates under the direction of a Main Application program 24. To enhance portability, the Image Generator 23 includes an Interface Package 25 for handling communications with the Main Application 24 and an Interface Package 26 that insulates the Image Generator 23 from the particular Operating System 27 running on Computer 10. This enhances portability and permits implementation of the Image Generator 23 on a plurality of different computer systems.

Figure 2:
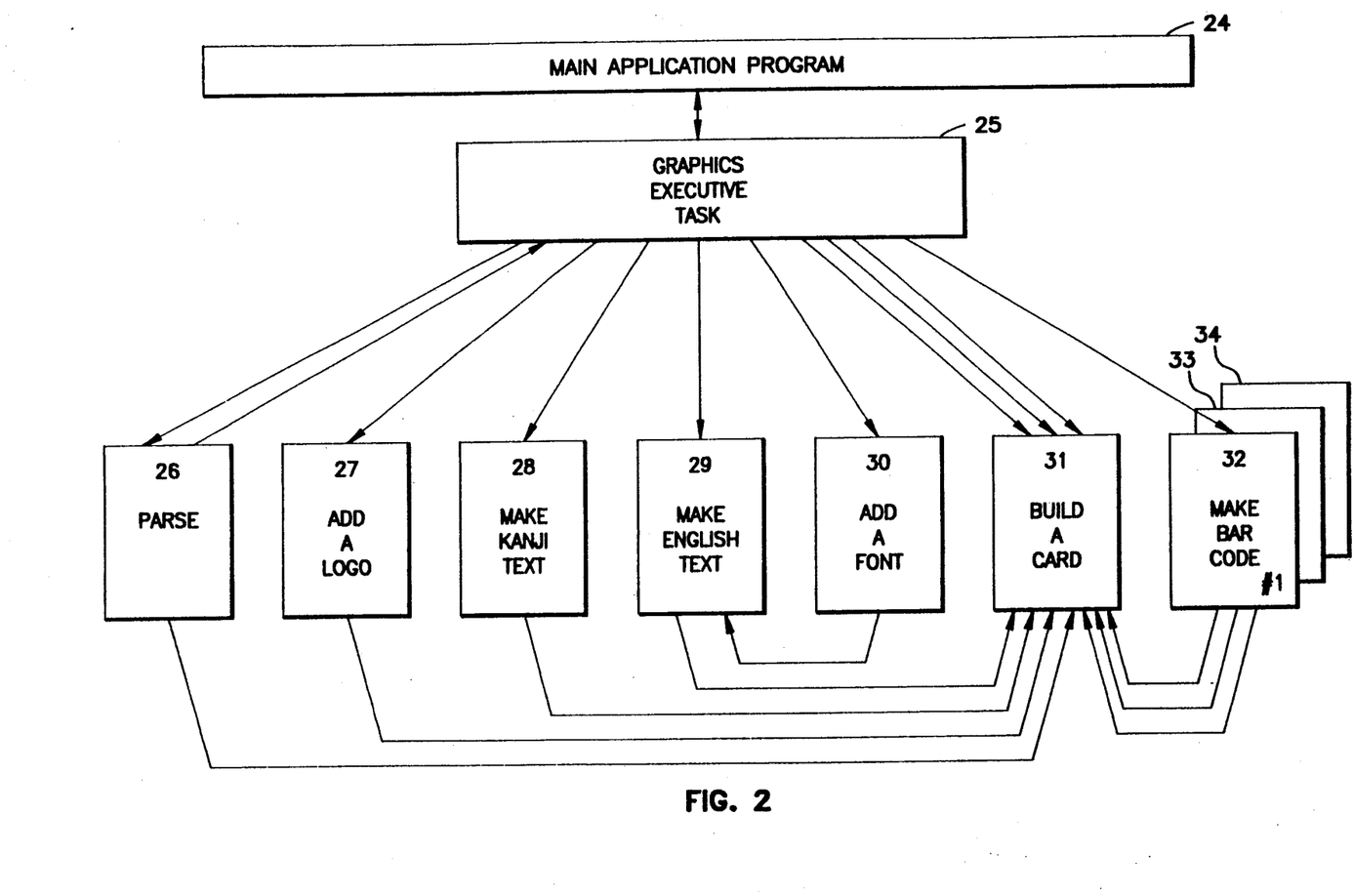
FIG. 2 is a block diagram describing the relationships between tasks of the Image Generator software.

The Image Generator 23 permits a number of different types of images to be printed on plastic cards, including logos, English text, Kanji text, and a plurality of barcode types. The functions provided by the Image Generator 23 are illustrated in FIG. 2. The primary routine, called the Grafix Executive task 25, controls the operation of the Image Generator 23. The Executive task 25 communicates with the Main Application 24 and in turn directs the operation of a number of other tasks, labeled in FIG. 4 as 26, 27, 28, 29, 30, 31, 32, 33, and 34. Although an alternative embodiment could operate in a non-multi-tasking environment, the preferred embodiment distributes functions of the Image Generator 23 amongst distinct tasks within a real-time, pre-emptive, multi-tasking environment. This provides the advantages of speed, portability, and expandability. The speed of execution of the Image Generator 23 increases because while one task is waiting, for example, on an I/O completion, other tasks can continue to execute. The modular nature of the tasks simplifies portability by breaking a complex piece of software into smaller, more manageable units. This modular approach to tasks also makes it easy for a programmer to add more features to the Image Generator 23 and to promote additional parallelism.

Figure 3:
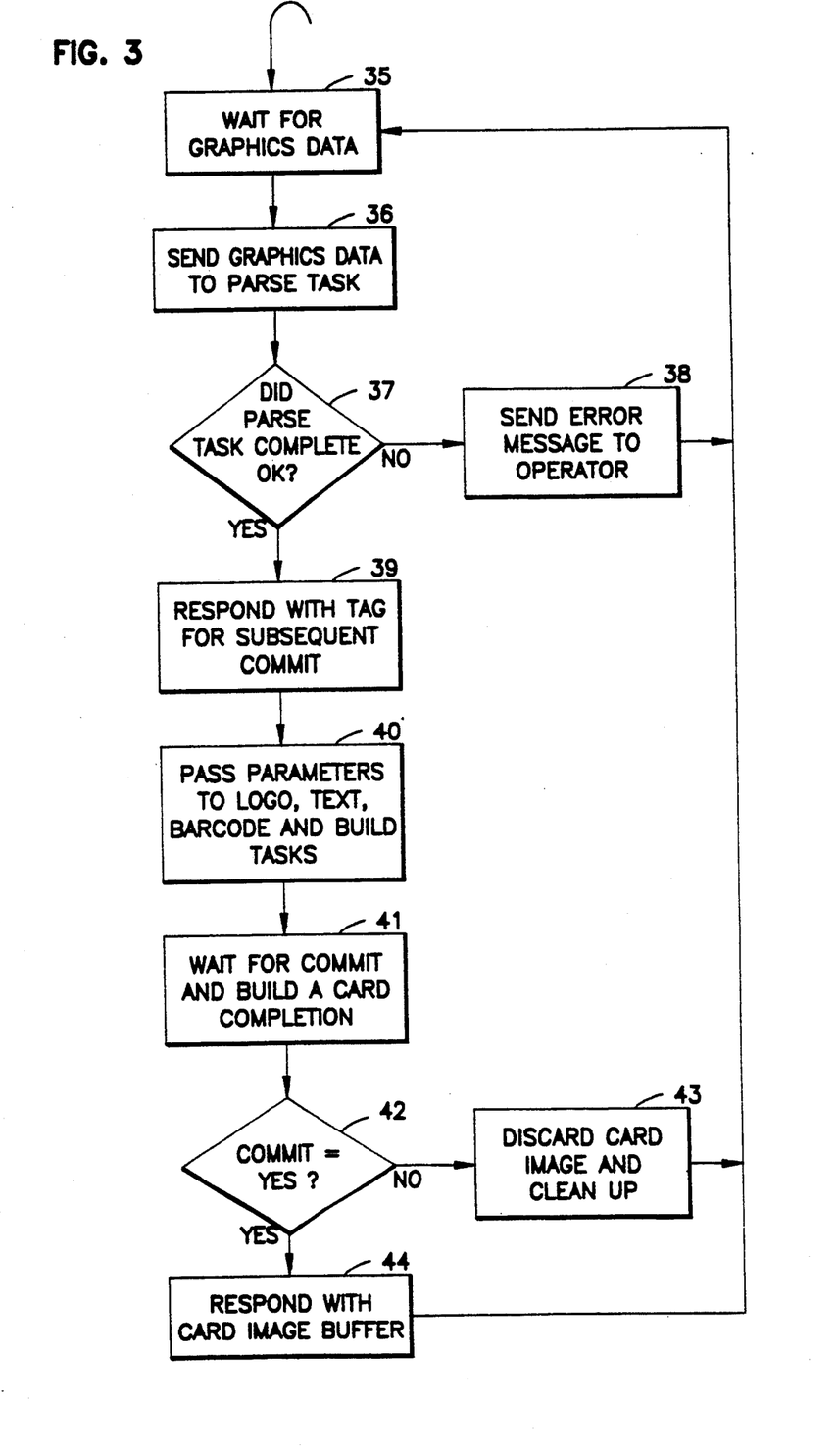
FIG. 3 is a flow chart describing the functions Grafix Executive task.

FIG. 3 is a flow diagram describing the functions performed by the Grafix Executive task. The Executive task 25 waits to receive graphics data from the Main Application 24 (35). The Main Application 24 reads the graphics data from an input tape or from a communications line. The Executive task 25 sends the graphics data t the Parse task 26 (36) and then waits for the Parse task 26 to complete its functions (37). If an error occurs during the parsing function, the Executive task 25 sends a message to the operator (38). If the parsing function is completed successfully, a tag identifying the graphics record is sent to the Main Application 24 so that the Main Application 24 can synchronize graphics image printing within the personalization process and respond in the future with a "commit" message (39). The Executive task 25 then initiates the tasks which creates the image elements for the card image (40). The Executive task 25 waits for a "commit" command from the Main Application 24 and the completion of the Build A Card task 31 (41). If the Main Application 24 does not issue a "commit" command but instead issues an "abort" command, the Executive task 25 will discard the card image built by the Build A Card task 31 (41). Once a "commit" is received from the Main Application 24 and the Build A Card task 31 completes, the resulting card image is sent to the Main Application 24 (44), which synchronizes and initiates the operation of the Print Engine 21. Upon completion, the Executive task 25 awaits another graphics record (35).

Figure 4:
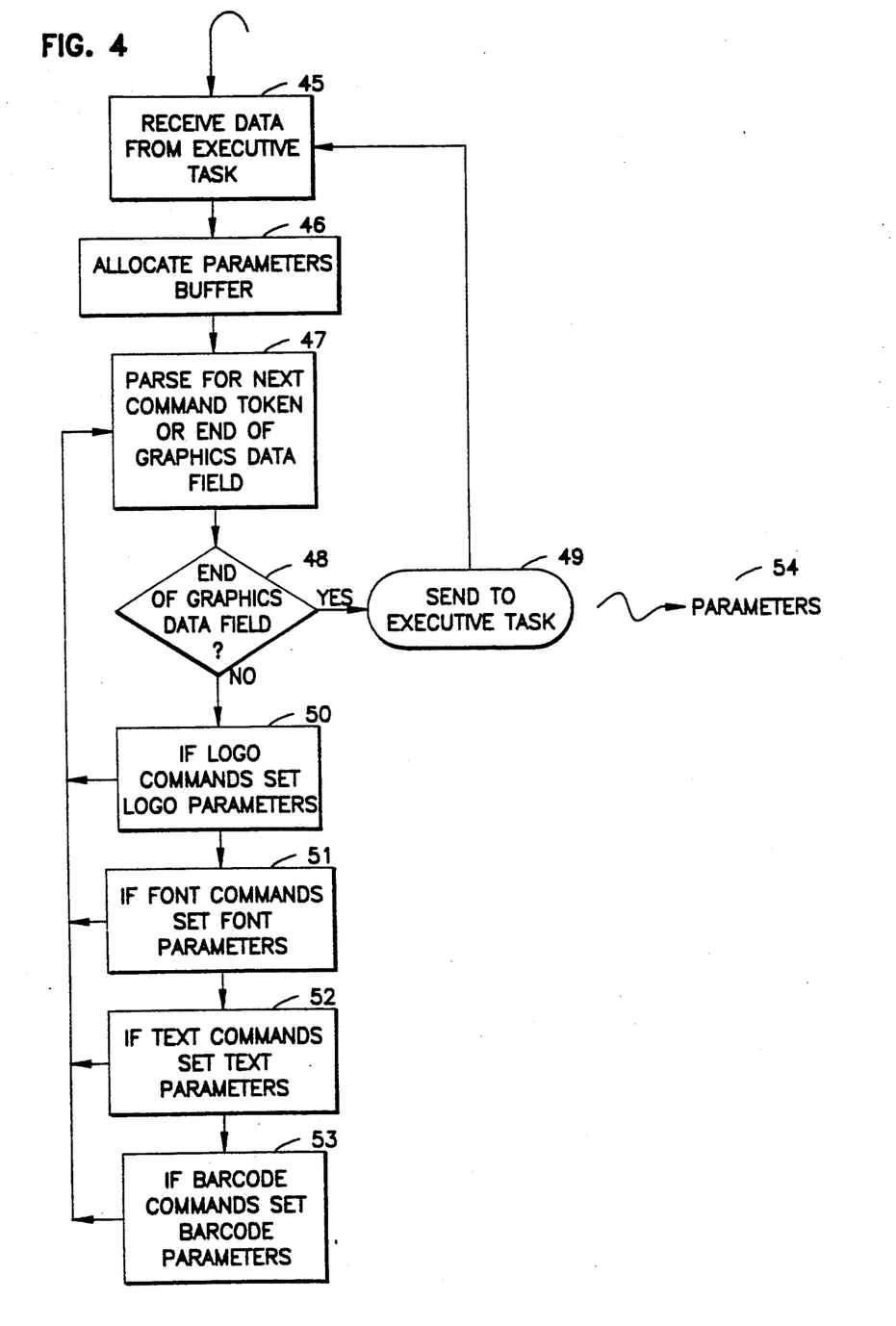
FIG. 4 is a flow chart describing the functions of the Parse task.

FIG. 4 is a flow chart describing the functions of the Parse task 26. The Parse task 26 waits to receive graphics data from the Executive task 25 (45). Once the data is received the Parse task 26 will allocate a parameter buffer (46). The Parse task 26 then begins parsing graphics commands from the graphics data field (47). This parsing function continues until the end of the graphics data field is encountered (48). If logo commands are parsed, the Parse task 26 will set the logo parameters in the parameter buffer (50). If font commands are encountered, the Parse task 26 will set the font parameters in the parameter buffer (51). If text commands are encountered, the Parse task 26 will set the text parameters in the parameter buffer (52). If barcode commands are encountered, the Parse task 26 will set the barcode parameters in the parameter buffer (53). Once the end of the graphics data field is encountered, the address of the parameter buffer 54 is sent back to the Executive task 25 (49), which in turn sends the parameter data to the other tasks.

Figure 5:
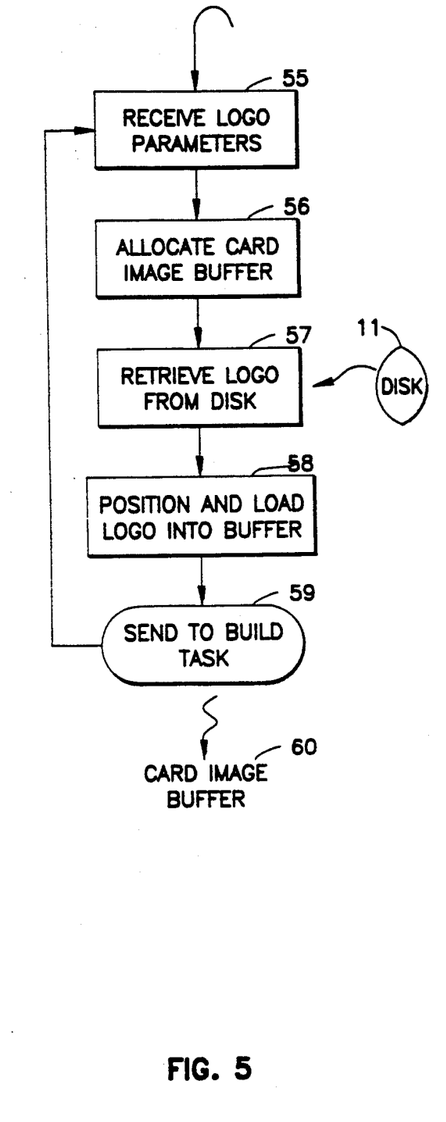
FIG. 5 is a flow chart describing the functions of the Add A Logo task.
Figure 10:
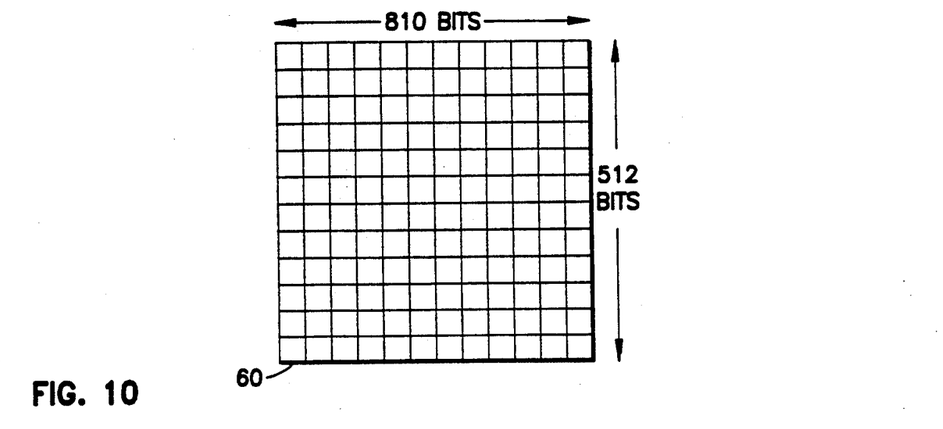
FIG. 10 illustrates the card image buffer allocated by the Add A Logo task.
Figure 11:
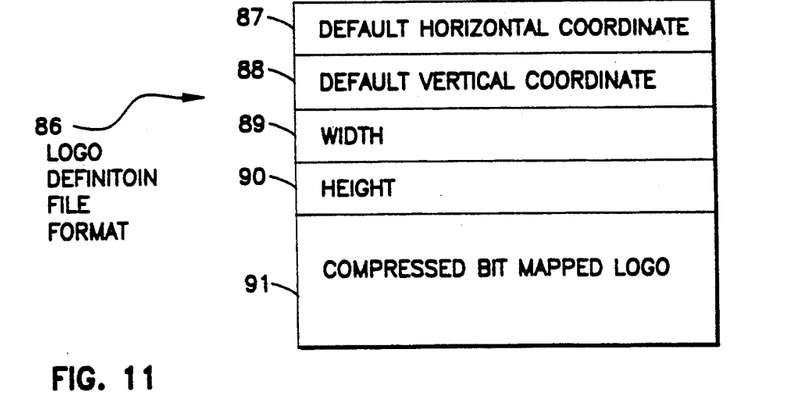
FIG. 11 describes the format of the Logo Definition File.

FIG. 5 is a flow chart describing the functions performed by the Add A Logo task 27. The Logo task 27 receives the logo parameters from the Executive task 25 (55). The Logo task 27 allocates a Card Image Buffer 60 (56), shown in FIG. 10, which in the preferred embodiment is a two-dimensional array of 512 bits×810 bits. The Logo task 27 retrieves the requested bit mapped image from the Disk 11 by matching the name passed in the logo parameters with file names residing on the Disk 11 (57). FIG. 11 describes the format of a Logo Definition File 86. The Logo Bit Map 91 is positioned within the Card Image Buffer 60 according to either the logo parameters received from the Executive task 25 or the Default Horizontal Coordinate 87 and Default Vertical Coordinate 88 residing in the Logo Definition File 86. The Card Image Buffer 60 is then sent to the Build A Card task 31 (59). The Logo task 27 will await the next set of logo parameters (55).

Figure 6:
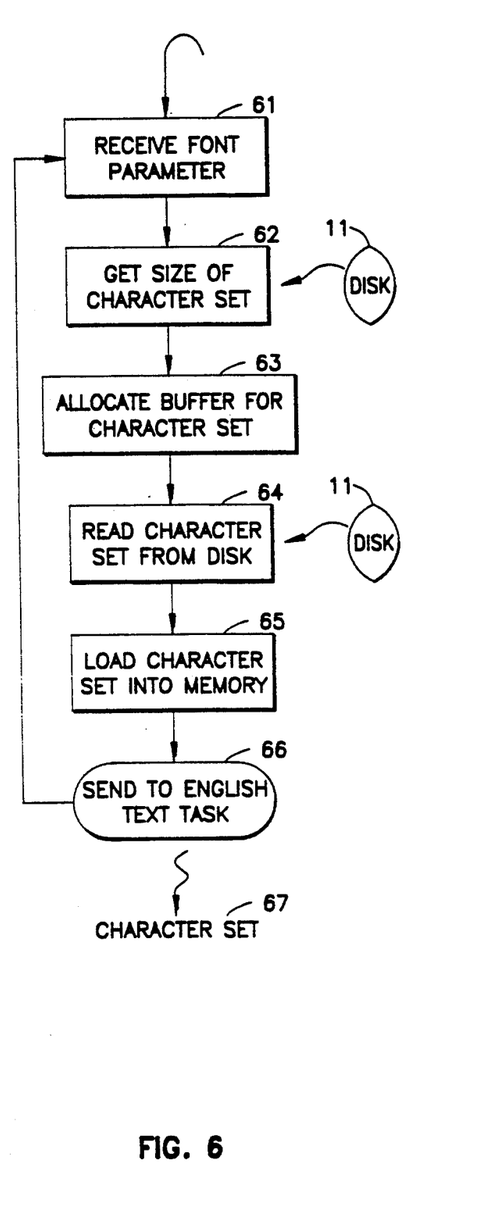
FIG. 6 is a flow chart describing the functions of the Add A Font task.

FIG. 6 is a flow chart describing the functions of the Add A Font task 30. The Font task 30 receives the font parameters from the Executive task 25 (61). The Font task 30 accesses the Disk 11 to determine the size of the requested character set (62). The Font task 30 allocates a buffer of sufficient size to store the character set (63). The Font task 30 then reads the character set from the Disk 11 (64) and loads it into memory (65). At this point, the Font task 30 transmits the character set 67 to the Make English Text task 29 (66). The Font task 30 then returns to wait for the next set of font parameters (61).

Figure 7:
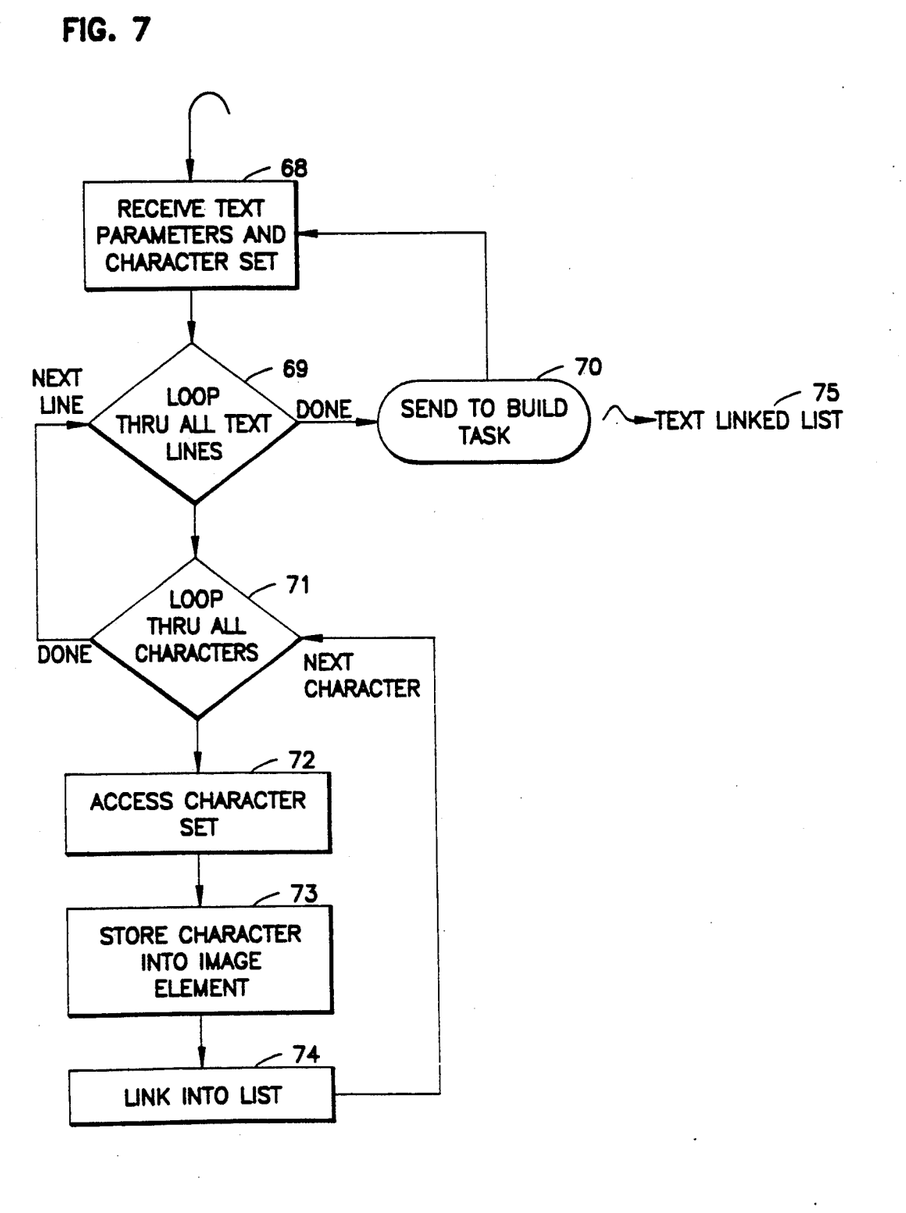
FIG. 7 is a flow chart describing the functions of the Make (English or Kanji) Text task.

FIG. 7 is a flow chart describing the functions of either the Make Kanji Text task 28 and the Make English Text task 29. The Text tasks 28 and 29 wait to receive the the text parameters from the Executive task 25 (68). The Make English Text task 29 also waits t receive the character set from the Font task 30 (68). The Text tasks 28 and 29 execute two loops, the first to process all Kanji or English text lines (69), the second to process all characters within a single text line (71).

Each character from the data parameter is used to access a specific character image (72). The Make English Text task 29 accesses a character image residing in the character set sent from the Font task 30. The Make Kanji Text task 28 accesses a character image residing on a Kanji ROM peripheral device described in the co-pending patent application "Rom Conversion Device And Method" and assigned to the assignee of the present invention. The Make Kanji Text task 28 may also access custom Kanji character images stored in files on Disk 11 if the character image desired does not reside on the Kanji ROM peripheral device.

Figure 14:
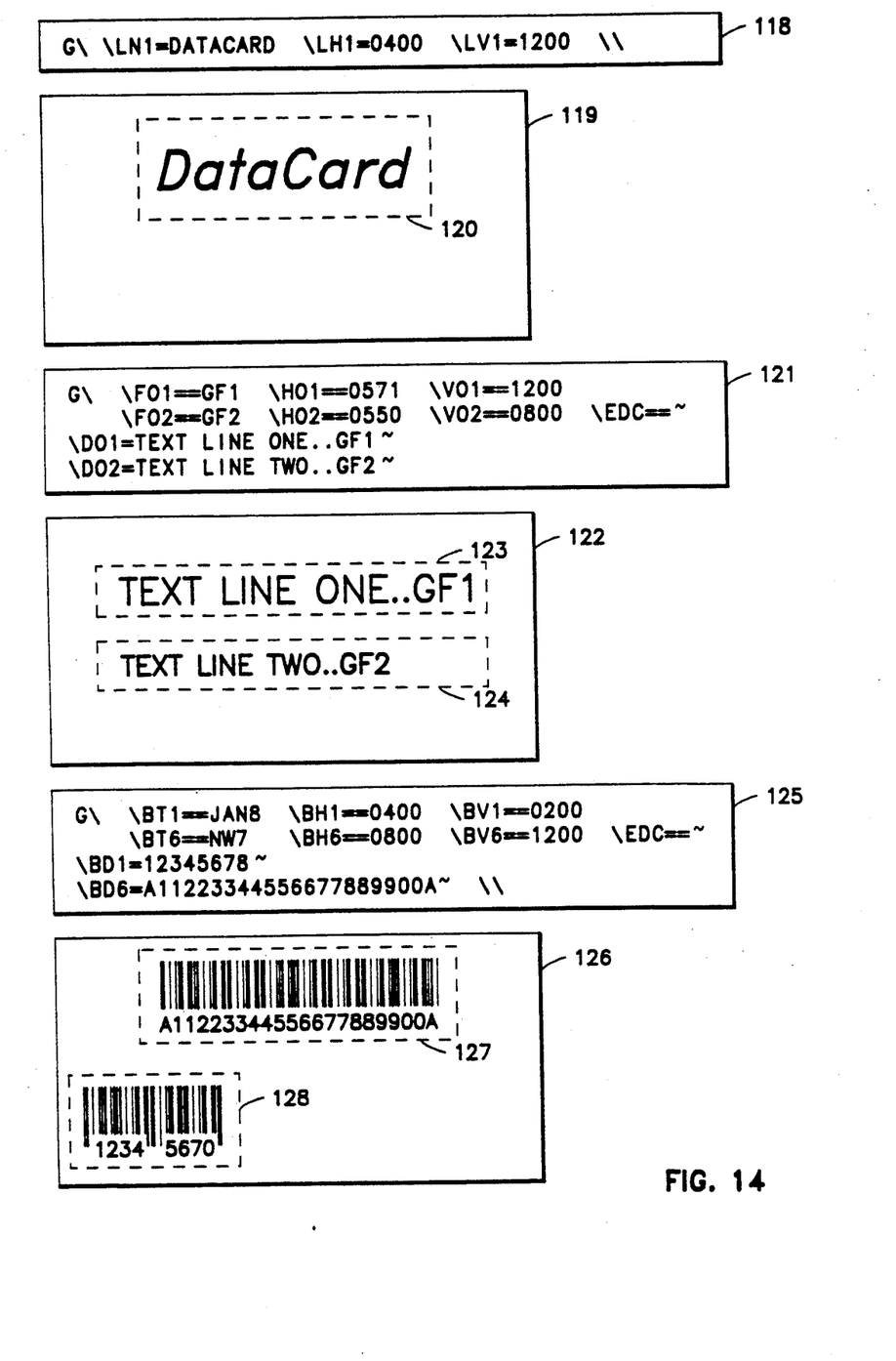
FIG. 14 shows three examples of graphics data and the resulting card images that are created.

The character image retrieved is stored in a Image Element 111 as shown in FIG. 14 (73). The Image Element 111 is then stored in a linked list pointed to by Element List Pointer 110 (74). This cycle repeats for each character in a text line (71) and for each text line specified in the text parameters (69). Once all text lines have been processed, the linked list containing the characters stored in individual Image Elements 111 is sent to the Build A Card task 31 (70). The Text tasks 28 and 29 then wait for the next set of text parameters (68).

Figure 8:
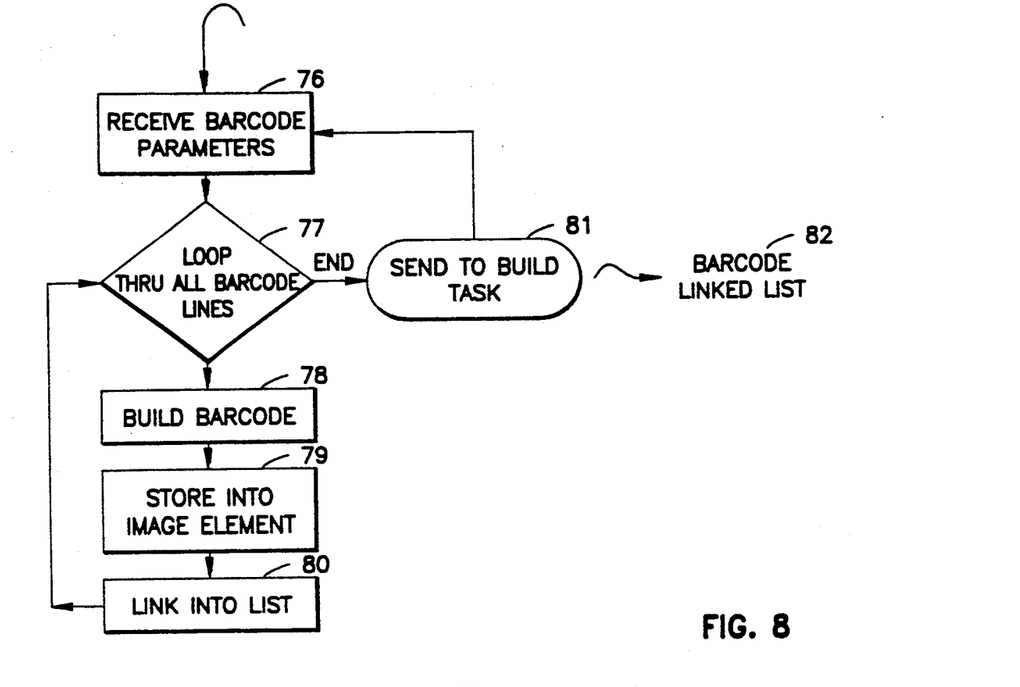
FIG. 8 is a flow chart describing the functions of the Make A Barcode (#1,2,3) task.

FIG. 8 is a flow chart describing the functions of the Make A Barcode tasks 32, 33, and 34. In the preferred embodiment three types of barcodes can be generated: JAN8, JAN13, and NW7. Three separate Barcode tasks, 32, 33, or 34, are used to process each of the three barcode types, in an attempt to enhance parallelism and performance. Each Barcode task waits to receive barcode parameters from the Executive task 25 (76). Once received, the Barcode task will loop through all barcode lines, of the corresponding type, specified in the barcode parameters (77). Within each line a barcode may be generated from a look-up table similar to a character set (78). Some barcodes require the generation of "check digits" before this look-up function occurs (78). Some barcode algorithms also require a specific amount of spacing between the barcode elements (78). The entire barcode is built at one time (78) and the resulting data is stored in an Image Element 111 as shown in FIG. 14 (79). Each barcode is inserted into a barcode linked list pointed to by an Element List Pointer 110 (80). Upon completion, this barcode linked list 82 is sent to the Build A Card task 31 (81).

Figure 9:
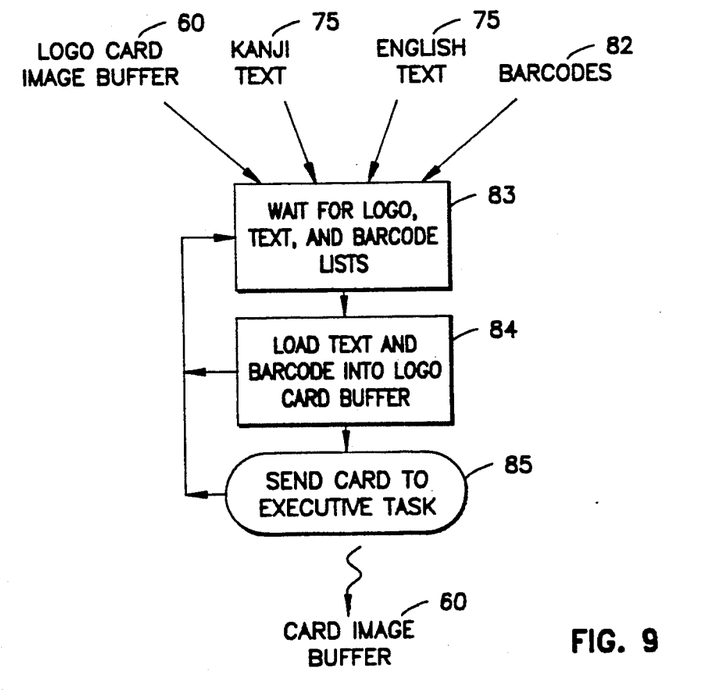
FIG. 9 is a flow chart describing the functions of the Build A Card task.

FIG. 9 is a flow chart describing the functions of the Build A Card task 31. The Build task 31 waits to receive a Card Image Buffer 60 from the Logo task 27 and separate linked lists for Kanji or English text 75 and barcodes 82. Once all linked lists have been received (83), the Build task 31 will load these images into the Card Image Buffer 60, positioning each element according to the Horizontal and Vertical Coordinates 112 and 113 stored in the Image Element 111 (84). Once this is accomplished, the Card Image Buffer 60 is returned to the Executive task 25 (85), which in turn transmits the Card Image Buffer 60 to the Main Application 24.

A custom set of graphics commands are used to specify the data for each of the graphics images discussed herein. The graphics commands can be provided either from magnetic tape or on-line communications with a remote computer system. The commands are independent of media type. These commands specify what graphics images to use, where on the card the data should be placed, which character set to use, and which barcode type should be generated. The commands are specifically designed to be extendable for future enhancements.

Figure 12:
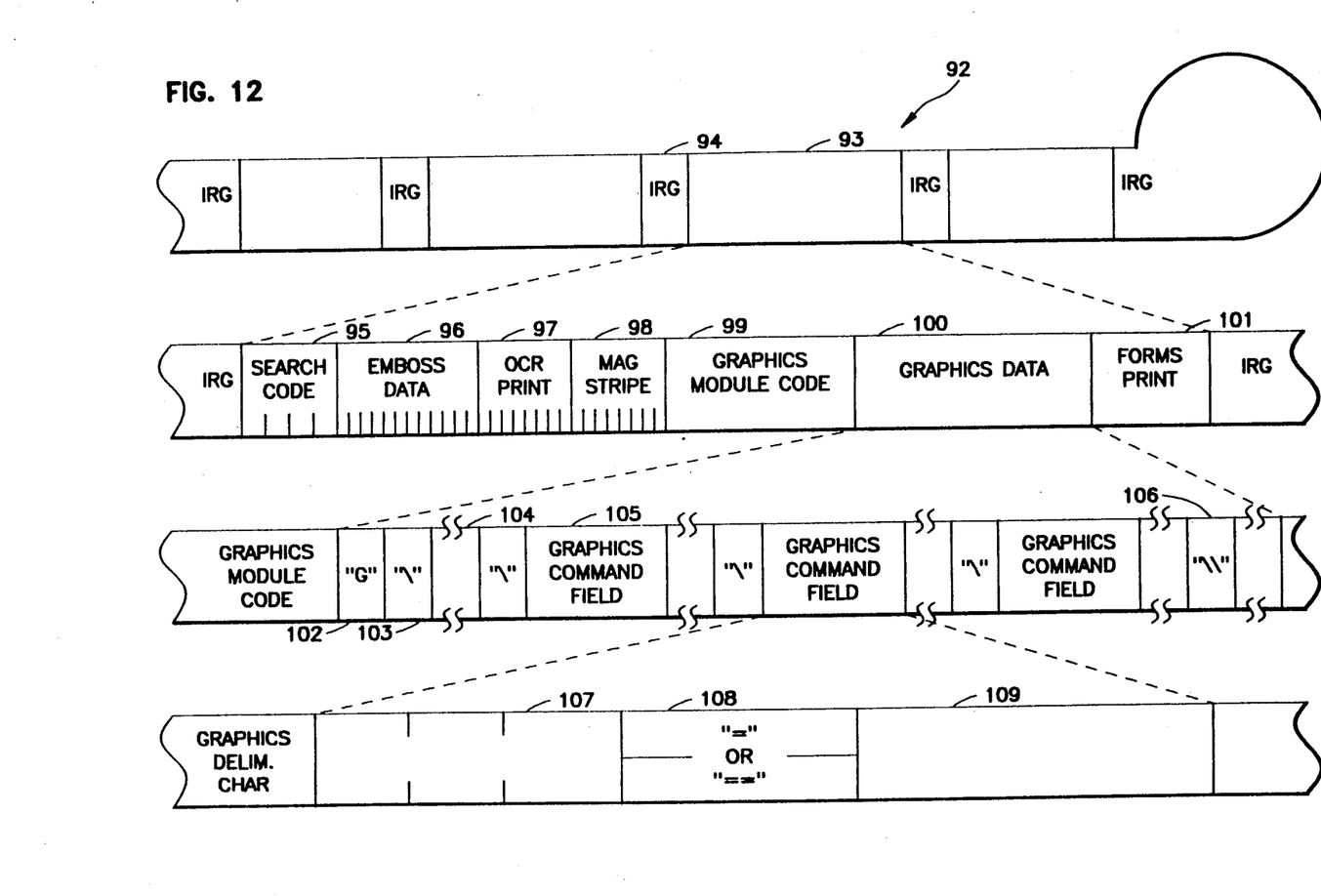
FIG. 12 describes the input data format and field structure.
Figure 13:
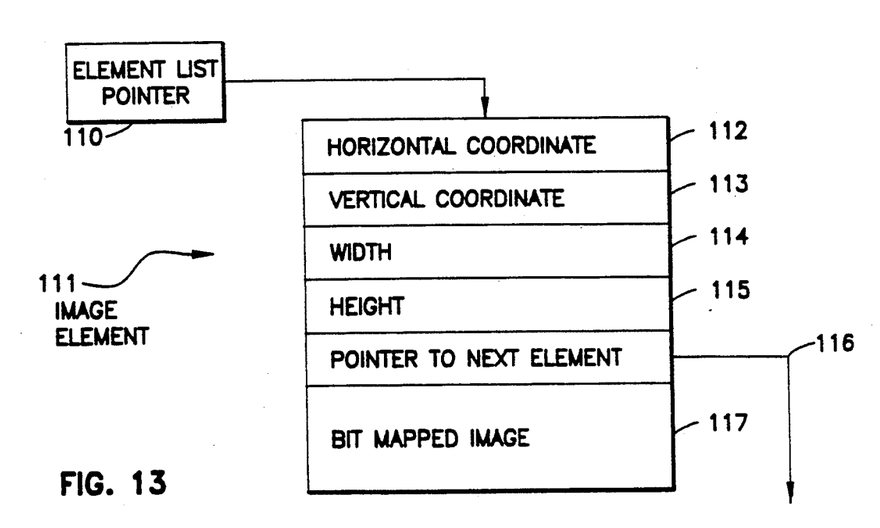
FIG. 13 describes the image element data structure.

FIG. 12 describes the format of the input data. FIG. 12 shows the Graphics Data field 100 and its relationships to the rest of the data in the input record. The input data stream is divided into physical groups of characters called blocks. These blocks are either transmitted individually from a remote computer system or separated by an Inter-Record Gap 94 when stored on a magnetic tape 92. Each block consists of one or more logical groups of characters called records. The preferred embodiment accepts only those data streams which have one record per block. Within each record there can be many fields. A number of data fields are shown in FIG. 12: Search Code 95, Embossing Data 96, OCR Print Data 97, Magnetic Stripe Data 98, and Forms Printer Data 101. In the preferred embodiment, placement of these different fields must be structured as shown in FIG. 12. The start of the Graphics Data field 100 is identified by the Graphics Module Code 99. This 8 bit code must be unique within the block of data.

The first character of the Graphics Data field 100 is the Command Language Version Code 102, which specifies the version of the command language. The intent is to provide a "hook" to identify future versions of the command language (which may not be compatible with the previous versions). The Image Generator 23 can identify which version is in use by reading this initial character. An error condition can be indicated if the Image Generator 23 does not support the version indicated. In the preferred embodiment, this character must be "G".

The second character of the Graphics Data field 100 is the Command Delimiter Code 103. This position in the Graphics Data field 100 specifies a single character code which is used throughout the remainder of the current Graphics Data field 100 as a delimiter. This character precedes every graphics command. The end of the Graphics Data field 100 is signified by two sequential occurrences of this character. Any character may be used as the Command Delimiter Code 103. In FIG. 12 a "back-slash" is used.

Following the Command Delimiter Code 103, the Image Generator 23 reads the Graphic Data field 100 in a sequential manner looking for the next occurrence of the Command Delimiter Code 103. Until the Command Delimiter Code 103 is found, all characters 104 that are read are ignored. This provides the capability of embedding comments into the Graphics Data field 100.

After the Image Generator 23 finds an occurrence of the Command Delimiter Code 103, the following field is a Graphics Command field 105. The first three characters of each Graphics Command field 105 is a Command Mnemonic 107. In general, there are two command types, those which supply data and those which specify how and where the data should be put on the plastic card. Following the three character Command Mnemonic 107 is an Operator Subfield 108 consisting of one or two equal sign characters. One equal sign indicates the value which follows is to be used for only the Graphics Data field 100 in which it appears. Such a value is called a "transient" parameter. Two equal signs indicate that the value which follows is to be used not only for the Graphics Data field 100 in which it appears, but also for all subsequent Graphics Data fields 100 until it is changed by a future occurrence of the same command. Such a value is called a "persistent" parameter. The third portion of the Graphics Command field 105 holds the Command Value 109. The format of this field and its length depends on which Command Mnemonic 107 is used.

Figure 15:
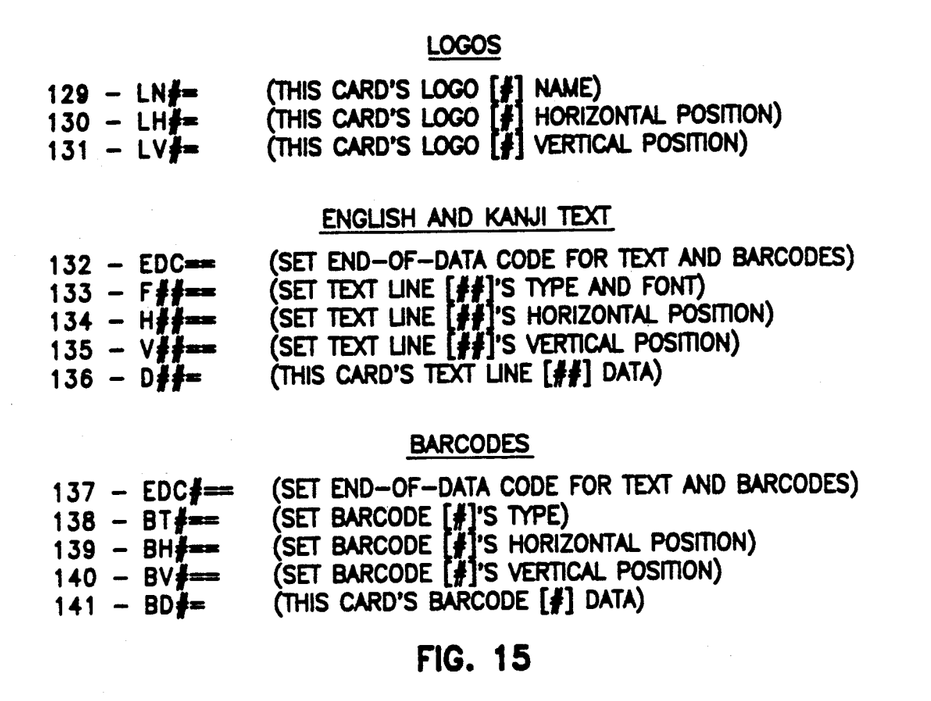
FIG. 15 describes the graphics command language used by the present invention.

FIG. 15 describes each Command Mnemonic 107 and its usage. For all of these commands, a warning message is displayed to the operator in the event that an unrecognized command or value is used. Warnings are also generated if a command would position an image off the edge of the card or if the requested logo, character set, or barcode type does not exist. When any errors occur, card personalization is interrupted until the operator resumes production.

The "LN#=" command 129 is a transient data command that specifies the name of the logo identified by "#". This command must be used in each Graphics Data field 100 that requires a logo on the card. An example of this command is shown in FIG. 14. Graphics Data field 118 associates the logo name "DATA-CARD" with the command "LN1". The resulting logo 120 is shown on the card 119.

The "LH#=" command 130 is a transient control command that specifies the horizontal position of the left edge of the logo identified by "#". The command value is four numeric characters representing a base 10 number of 0.001 inch units. This number is the horizontal distance from the left edge of the card to the left edge of a minimum size, imaginary, rectangle which encloses the logo. The reference point for logo positioning is defined as the lower left corner of the imaginary rectangle, called the "logo definition rectangle", which is just big enough to enclose the logo. An example is shown in FIG. 14. Graphics Data field 118 contains the command "LH1" which results in the horizontal placement of image 120 on card 119. If an "LH#=" is not specified in the Graphics Data field 100, then the Default Horizontal Coordinate 87 stored in the Logo Definition File 86 is used. It is recommended that this command not be used in the Graphics Data field 100. Instead, logo positioning should be controlled by the values stored in the Logo Definition File 86, which the system operator can easily modify.

The "LV#=" command 131 is a transient control command that specifies the vertical position of the bottom edge of the logo identified by "#". This command is used within each Graphics Data field 100 that activates a logo. The command value must be four numeric characters representing a base 10 number of 0.001 inch units. This number is the vertical distance from the bottom edge of the card to the bottom edge of the logo definition rectangle which encloses the logo. An example is shown in FIG. 14. Graphics Data field 118 contains the command "LV1" which results in the vertical placement of image 120 on card 119. If an "LV#=" is not specified in the Graphics Data field 100, then the Default Vertical Coordinate 88 stored in the Logo Definition File 86 is used. It is recommended that this command not be used in the Graphics Data field 100. Instead, positioning should be controlled by the values which were stored in the Logo Definition File 86, which the system operator can easily modify.

Figure 16:
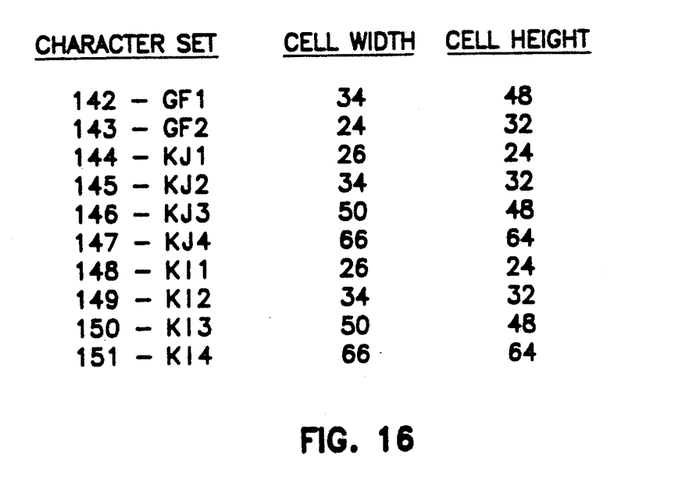
FIG. 16 describes the cell sizes of some representative character sets.

The command "F##=" 133 is a persistent format control command which specifies the font for the text line identified by "##". Currently the only command values that are valid are "GFx", "KJx", and "KIx". The value "GFx" specifies that the text line uses single byte EBCDIC character coding for English text and that the character image definitions are stored in the character set identified by "x". The value "KJx" specifies that the text line uses two byte JIS (Japanese Information Standard) Kanji character coding and prints the Kanji characters at the size associated with "x". The command value "KIx" specifies that the text line uses two byte IBM Kanji character coding and prints the Kanji characters at the size associated with "x". In the preferred embodiment, the size of the character cell is listed in the table in FIG. 16. The cell width and cell height values 142 through 151 in FIG. 16 represent the number of bits in each dimension. The various command values, or character set designators, are not tied to the specific combinations listed in FIG. 16. Rather, they can be treated as logical designators. The contents associated with each character set designator can be altered by input data or operator command. These commands request the loading of a particular character set into a memory location associated with the command value. For example, assume there are only two memory locations for storing character sets, but the system has a selection of four character sets from which to choose. The system could be forced to load any of the character sets into the memory location associated with command value "GF1".

The command "D##=" 136 is a transient data command which specifies the data to be used for the text line identified by "##". This command is used within each Graphics Data field 100 that activates a text line of any type. For English text, identified by the command "F##==GF", the value field is a string of single byte EBCDIC codes which each represent one text character. For Kanji text, specified by the command "F##==KJ", the value field is a string of two byte JIS codes, each representing one Kanji text character. Each JIS code activates one Kanji character from either the 6,349 character JIS standard set or from the custom Kanji character set. For Kanji text, identified by the operator "F##==KI", the value field is a string of two byte IBM codes each representing one Kanji text character. Each IBM code activates one Kanji character from either of the IBM Kanji character set or from the custom Kanji character set. In all cases, the string of character codes must be followed the end-of-data character specified by the command mnemonic "EDC==". An example is shown in FIG. 14. Graphics Data field 121 contains two "D##=" fields. The command field "D01" in Graphics Data field 121 results in the image 123 on card 122. The command field "D02" in Graphics Data field 121 results in the image 124 on card 122.

The "EDC==" command 132 is a persistent format control command that sets the end-of-data character for all text and barcode data strings. Being a persistent parameter, this code can be used once in a Graphics Data field 100 and it will remain in effect for subsequent Graphics Data fields 100 until the command mnemonic is again encountered. An example is shown in FIG. 14.

Graphics Data field 121 contains two "D##=" fields that are both terminated by with the EDC character "~".

The "H##==" command 134 is a persistent format control command that sets the horizontal position of the first character of the text line identified by "##". The command value must be four numeric characters representing a base 10 number of 0.001 inch units. This number is the horizontal distance from the left edge of the card to the horizontal center line of the text character. An example is shown in FIG. 14. Graphics Data field 121 contains two "H##=" fields. The command field "H01" in Graphics Data field 121 results in the horizontal placement of image 123 on card 122. The command field "H02" in Graphics Data field 121 results in the horizontal placement of image 124 on card 122.

The command "V##==" 135 is a persistent control command that sets the vertical position of the text line identified by "##". The value for this command consists of four numeric characters representing a base 10 number of 0.001 inch units. This value is the vertical distance from the bottom edge of the card to the base line of the text character. An example is shown in FIG. 14. Graphics Data field 121 contains two "V##=" fields. The command field "V01" in Graphics Data field 121 results in the vertical placement of image 123 on card 122. The command field "V02" in Graphics Data field 121 results in the vertical placement of image 124 on card 122.

The command "BT#==" 138 is a persistent format control command that sets the barcode type for the barcode identified by "#". This command is used within each Graphics Data field 100 that activates a barcode or, since it is a persistent parameter, it can be used only once and it will remain set until specified again. Currently, only the following barcode types are valid: JAN8, JAN13, and NW7. Other barcode types can be added easily. An example is shown in FIG. 14. Graphics Data field 125 contains two "BT#=" fields. The command field "BT1" in Graphics Data field 125 results in the JAN8 barcode 128 on card 126. The command field "BT6" in Graphics Data field 125 results in the NW7 barcode 127 on card 126.

The command "BD#=" 141 is a transient data command which specifies the data to be used for the barcode identified by "#". This command is used whenever a Graphics Data field 100 activates the barcode of any type. An example is shown in FIG. 14. Graphics Data field 125 contains two "BD#=" fields. The command field "BD1" in Graphics Data field 125 results in the JAN8 image 128 on card 126. The command field "BD6" in Graphics Data field 125 results in the NW7 image 127 on card 126.

The command "BH#==" 139 is a persistent control command that sets the horizontal position for the barcode's left edge. This command is used within each Graphics Data field 100 that activates a barcode image or, because it sets a persistent parameter, it may be specified only once and will remain set until specified again. The command field consists of four numeric characters 0-9 representing a base 10 number of 0.001 inch units. This value is the horizontal distance from the left edge of the card to the left edge of an imaginary rectangle which encloses the barcode. An example is shown in FIG. 14. Graphics Data field 125 contains two "BH#=" fields. The command field "BH1" in Graphics Data field 125 results in the horizontal placement of image 128 on card 126. The barcode command "BH6"

in Graphics Data field 125 results in the horizontal placement of image 127 on card 126.

The command "BV#==" 140 is a persistent control command that sets the vertical position of the barcode's bottom edge for the barcode identified by "#". The value for this command consists of four numeric characters representing a base 10 number of 0.001 inch units. This value is the vertical distance from the bottom edge of the card to the bottom edge of an imaginary rectangle which encloses the barcode. An example is shown in FIG. 14. Graphics Data field 125 contains two "BV#=" fields. The command field "BV1" in Graphics Data field 125 results in the vertical placement of image 128 on card 126. The command field "BV6" in Graphics Data field 125 results in the vertical placement of image 127 on card 126.

The commands discussed above use 0.001 inch units to describe the image elements, positions The actual positioning of image elements requires that any dimensions specified in inches be converted to bits. The Print Engine 21 driven by the Image Generator 23 has a printing resolution of 240 bits per inch horizontal and 240 bits per inch vertical. The entire card image, shown in FIG. 10, is 810 bits wide and 512 bits high. The formula used to convert inches to bits, therefore, is:

$$\text{Bits} = (0.001 \text{ inch units} \times 6) + 12)/25$$

An alternative embodiment of the present invention includes a macro definition and execution facility for the graphics command language. This embodiment provides the "EXM=" command which means "execute the macro stored under the following macro name." The Image Generator 23 would read the macro file, retrieve the Graphics Data field 100 stored therein under the macro name, and execute the specified graphics commands. Additional command variations would include means for specifying the vertical and horizontal positions of an image in alternative units, centering commands, left and right justification commands, and scaling commands. An alternative embodiment would also include means for entering bit mapped images via the input data stream.

Although a specific configuration has been illustrated and described for the preferred embodiment of the present invention set forth herein, it will be appreciated by those of ordinary skill in the art that any configuration which is calculated to achieve the same purpose may be substituted for the preferred embodiment shown. This application is intended to cover any adaptations or variations of the present invention. Therefore, it is manifestly intended that this invention be limited only by the claims and the equivalence thereof.

What is claimed is:

1. A plastic card personalization system comprised of a computer and a graphics printer connected to the computer for printing a plurality of different types of images on the plastic cards, the card personalization system comprising:
   (a) memory storage means for storing a control data stream comprising at least one graphics command;
   (b) first control means executing on the computer for reading said graphics commands from the memory storage means;
   (c) second control means executing on the computer for interpreting said graphics commands read from said memory storage means, and in response thereto, deciding what graphics images to use and where on the plastic cart the graphics images should be placed;
   (d) said graphics commands identified in said control data stream by a command language version code;
   (e) said command language version code comprised of a command delimiter code and a single character code which is used throughout the remainder of said graphics commands as a delimiter wherein said delimiter precedes every said graphics command, and further, wherein two sequential occurrences of said delimiter signifies an end to said control data stream;
   (f) said delimiter followed by at least one graphics command field comprised of a command mnemonic, an operator subfield, and a command value;
   (g) said command mnemonic comprising one of a plurality of commands which supply data and commands which specify how and where the graphics images should be placed on the plastic card;
   (h) said operator subfield indicating whether said command value is a transient or persistent command value, wherein said transient command value is active only during the interpretation of said command mnemonics for the particular graphics command field in which it appears, and further, wherein said persistent command value is active for all occurrences of said command mnemonics in the present and subsequent graphics command fields until a new command value is assigned to said command mnemonic; and
   (i) said command value supplying data for the interpretation and operation of said command mnemonic by said second control means.

2. The apparatus of claim 1, wherein said graphics command field is comprised of a logo name command, a transient or persistent operator, and a command value which identifies a logo graphic stored in said memory storage means which is to be printed on the plastic card.

3. The apparatus of claim 1, wherein said graphics command field is comprised of a horizontal control command, a transient or persistent operator, and a command value that specifies the horizontal placement of the left edge of the logo image on the plastic card.

4. The apparatus of claim 1, wherein said graphics command field is comprised of a vertical control command, a transient or persistent operator, and a command value which identifies the vertical placement of the bottom edge of the logo on the plastic card.

5. The apparatus of claim 1, wherein said graphics command field is comprised of an end-of-data code command a transient or persistent operator, and a command value which identifies a character to be used to signify the end-of-data for text or bar codes.

6. The apparatus of claim 1, wherein said graphics command field is comprised of a character set command, a transient or persistent operator, and a command value which identifies a character set or font to be used when generating printed alphanumeric characters.

7. The apparatus of claim 1, wherein said graphics command field is comprised of a horizontal text control command, a transient or persistent operator, and a command value which identifies the horizontal placement of the left edge of the text on the plastic card.

8. The apparatus of claim 1, wherein said graphics command field is comprised of a vertical text control command, a transient or persistent operator, and a command value which identifies the vertical placement of the bottom edge of the text on the plastic card.

9. The apparatus of claim 1, wherein said graphics command field is comprised of a text data command, a transient or persistent operator, and a command value which identifies a alphanumeric character string to be used in selected characters from the character set or font for printing on the plastic card.

10. The apparatus of claim 1, wherein said graphics command field is comprised of a bar code type command, a transient or persistent operator, and a compound value which identifies a bar code character set, or method of construction, for a bar code graphic to be printed on the plastic card.

11. The apparatus of claim 1, wherein said graphics command field is comprised of a bar code horizontal control command, a transient or persistent operator, and a command value which identifies a horizontal placement for the left edge of the bar code graphic image on the plastic card.

12. The apparatus of claim 1, wherein said graphics command field is comprised of a bar code vertical control command, a transient or persistent operator, and a command value which specifies a vertical placement for the bottom edge of the bar code graphic on the plastic card.

13. The apparatus of claim 1, wherein said graphics command field is comprised of a bar code data command, a transient of persistent operator, and a command value which identifies a alphanumeric character string to be used in selecting bar code characters for printing on the plastic card.

* * * * *